US006594486B1

(12) United States Patent
Räsänen

(10) Patent No.: US 6,594,486 B1
(45) Date of Patent: Jul. 15, 2003

(54) TRANSPARENT AND NON-TRANSPARENT DATA TRANSMISSION IN MOBILE COMMUNICATION NETWORK

(75) Inventor: Juha Räsänen, Espoo (FI)

(73) Assignee: Nokia Corporation, Espoo (FI)

( * ) Notice: Subject to any disclaimer, the term of this patent is extended or adjusted under 35 U.S.C. 154(b) by 204 days.

(21) Appl. No.: 09/708,402

(22) Filed: Nov. 8, 2000

Related U.S. Application Data

(63) Continuation of application No. PCT/FI99/00386, filed on May 10, 1999.

(30) Foreign Application Priority Data

May 11, 1998 (FI) .................................................. 981042

(51) Int. Cl.$^7$ ............................ H04Q 7/20; H04B 1/38; H04J 3/16

(52) U.S. Cl. ....................... 455/422; 455/560; 455/552; 370/467

(58) Field of Search ................................ 455/560, 552, 455/422, 424, 425, 426, 461, 462, 466; 370/465, 467, 466; 405/553, 561

(56) References Cited

U.S. PATENT DOCUMENTS

| | | | | |
|---|---|---|---|---|
| 5,260,987 A | * | 11/1993 | Mauger ...................... | 455/560 |
| 5,878,343 A | * | 3/1999 | Robert et al. ................ | 455/424 |
| 5,917,816 A | * | 6/1999 | Jacobsohn ................... | 370/352 |
| 6,073,018 A | * | 6/2000 | Sallberg ...................... | 455/435 |
| H001880 H | * | 10/2000 | Vines et al. ................. | 370/310 |
| 6,167,279 A | * | 12/2000 | Chang et al. ................ | 455/462 |
| 6,192,055 B1 | * | 2/2001 | Rasanen ..................... | 370/465 |
| 6,327,268 B1 | * | 12/2001 | Sipila .......................... | 370/467 |
| 6,349,224 B1 | * | 2/2002 | Lim ............................ | 455/575 |

FOREIGN PATENT DOCUMENTS

| | | |
|---|---|---|
| EP | 0 818 938 | 1/1998 |
| GB | 2 318 258 | 4/1998 |
| WO | WO 97/28660 | 8/1987 |

OTHER PUBLICATIONS

Pr ETS 300 562, "European digital cellular telecommunications system (Phase 2); Rate adaption on the Mobile Station—Base System (MS–BSS) interface (GSM 04.21)", *European Telecommunications Standards Institute*, pp. 1–21 (Jul. 1994).

(List continued on next page.)

*Primary Examiner*—Duc Nguyen
(74) *Attorney, Agent, or Firm*—Squire, Sanders & Dempsey L.L.P.

(57) ABSTRACT

The invention relates to radio systems and particularly to non-transparent data transmission in a mobile communication system where a mobile services switching center and a radio access network belong to different system generations. A second-generation mobile services switching center is also provided with a protocol unit supporting a radio link protocol of a third-generation radio access network. In such a case the radio link protocol is set up between the mobile station and the mobile services switching center without a radio link protocol conversion in an interworking unit of the radio access network. The radio access network merely transmits the radio link protocol transparently between the mobile station and the mobile services switching center, i.e. it extends the protocol to the mobile services switching center. When a handover of a non-transparent call is carried out between two radio access networks, the same radio link protocol units (in the mobile station and in the mobile services switching center) also remain after the handover. Possibly ongoing sequences of selective retransmissions and retransmission requests of the radio link protocol are not interrupted or disturbed, wherefore it is also possible to avoid the manipulation of buffer synchronization which might possibly lead to retransmission complications and loss or doubling of data as a result of the handover.

15 Claims, 3 Drawing Sheets

OTHER PUBLICATIONS

ETS 300 563, "European digital cellular telecommunications system (Phase 2); Radio Link Protocol (RLP) for data and telematic services on the Mobile Station—Base Station (MS–BSS) interface and the Base Station System—Mobile–services Switching Centre (BSS–MSC) interface (GSM 04.22)", *European Telecommunications Standards Institute*, pp. 1–63 (Sep. 1994).

Pr ETS 300 575, "European cellular telecommunications system (Phase 2): Channel coding (GSM 05.03)", *European Telecommunications Standards Institute*, pp. 1–26 (Oct. 1993).

Pr ETS 300 583, "European digital cellular telecommunications system (Phase 2); Terminal Adaptation Functions (TAF) for services using asynchronous bearer capabilities (GSM 07.02)" *European Telecommunications Standards Institute*, pp. 1–21 (Jul. 1994).

Pr ETS 300 591, "European digital cellular telecommunications system (Phase 2); Rate adaption on the Base Station System—Mobile–services Switching Centre (BSS–MSC) interface (GSM 08.20)", *European Telecommunications Standards Insitute*, pp. 1–12 (Oct. 1993).

Pr ETS 300 737, "Digital cellular telecommunications system (Phase 2+); Inband control of remote transcoders and rate adaptors for Enhanced Full Rate (EFR) and full rate traffic channels (GSM 08.60 version 5.1.0)", *European Telecommunications Standards Institute*, pp. 1–35 (Sep. 1997).

ITU–T Recommendation V.24, "List Of Definitions For Interchange Circuits Between Data Terminal Equipment (DTE) And Data Circuit–Terminating Equipment (DCE)", *International Telecommunication Union—Telecommunication Standardization Sector of ITU*, pp. 1–19 (Mar. 1993).

Recommendation V.110, "Support Of Data Terminal Equipment With V–Series Type Interfaces By An Integrated Services Digital Network", *International Telecommunication Union—The International Telegraph And Telephone Consultative Committee*, pp. 1–58 (Sep. 1992).

International Search Report for PCT/FI99/00386.

\* cited by examiner

TRANSPARENT AND NON-TRANSPARENT DATA TRANSMISSION IN MOBILE COMMUNICATION NETWORK

This application is a continuation of international application Ser. No. PCT/FI99/00386, filed May 10, 1999.

BACKGROUND OF THE INVENTION.

1. Field of the Invention.

The invention relates to radio systems and particularly to non-transparent data transmission in a mobile communication system where a mobile services switching centre and a radio access network belong to different system generations.

2. Description of Related Art

Mobile communication systems generally refer to different telecommunication systems which enable personal wireless data transmission while subscribers roam in the system area. A typical mobile communication system is a Public Land Mobile Network (PLMN). First-generation mobile communication systems were analog systems where speech or data was transferred in an analog form similarly as in conventional public switched telephone networks. An example of a first-generation system is the Nordic Mobile Telephone (NMT).

In second-generation mobile systems, such as the Global System for Mobile Communication (GSM), speech and data are transmitted in a digital form. In addition to conventional speech transmission, digital mobile communication systems provide a plurality of other services: short messages, facsimile, data transmission, etc. Services provided by mobile communication systems can generally be divided into teleservices and bearer services. A bearer service is a telecommunication service which provides signal transmission between user-network interfaces. For example modem services are bearer services. In a teleservice the network also provides subscriber terminal services. Important teleservices include speech, facsimile and videotex services. Bearer services are usually divided into groups according to a property, such as asynchronous and synchronous bearer services. Each of these groups comprises a number of bearer services, such as a transparent service (T) and a non-transparent service (NT). In a transparent service the data to be transmitted is unstructured and transmission errors are corrected only by means of channel coding. In a non-transparent service the data to be transmitted is structured into protocol data units (PDU) and transmission errors are corrected by utilizing (in addition to channel coding) automatic retransmission protocols. For example in the GSM system such a link protocol is called a radio link protocol (RLP). This kind of link protocol is also generally referred to as link access control (LAC).

Currently under development are third-generation mobile communication systems, such as the Universal Mobile Communication System (UMTS) and the Future Public Land Mobile Telecommunication System (FPLMTS), which was later renamed as the International Mobile Telecommunication 2000 (IMT-2000). The UMTS is being standardized by the European Telecommunication Standards Institute (ETSI), whereas the International Telecommunication Union (ITU) standardizes the IMT-2000 system. These future systems are basically very similar. For example the UMTS, as all mobile communication systems, provides wireless data transmission services to mobile subscribers. The system supports roaming, which means that UMTS users can be reached and they can make calls anywhere as long as they are situated within the coverage area of the UMTS.

According to the current view, a UMTS consists of two or three parts, which are illustrated in FIG. 1: a UMTS access network 1 (or a UMTS base station system UMTS-BSS) and a core network 2, 3, 4 and 5. The UMTS access network will be referred to below generally as a radio access network. The UMTS access network 1 is mainly responsible for matters related to the radio path, i.e. it provides the core network with radio access required for wireless operation. The core network 2, 3, 4 or 5 is a conventional or future telecommunication network, which has been modified to utilize the UMTS access network efficiently in wireless communication. Telecommunication networks that are applicable as core networks include second-generation mobile communication systems, such as the GSM (Global System for Mobile Communication), ISDN (Integrated Services Digital Network), B-ISDN (Broadband Integrated Services Digital Network), packet data networks PDN, ATM (Asynchronous Transfer Mode), etc.

Therefore a UMTS access network should enable support for different core networks including networks that will possibly be developed in the future. Correspondingly, UMTS access networks should enable the connecting of different radio interfaces to the core network (narrowband, broadband, CDMA, TDMA, etc.). According to the present scenario the functions of a UMTS access network are strictly limited to radio access functions. Therefore the network mainly comprises functions for controlling radio resources (handover, paging) and for controlling bearer services (radio network service control). The more complicated functions, such as registers, register functions, mobility management and location management, are placed in each core network or in service providers which provide UMTS subscribes with different services and are connected to the core network.

According to UMTS terminology, the entire UMTS access network is called a generic radio access network (GRAN). The GRAN is further divided into a radio access network (RAN) and an interworking unit (IWU). In principle, between each core network 2–5 and RAN there is a separate IWU, such as IWUs 1 to 4 shown in the figure. The purpose of the IWU is to provide the connection between the core network and the RAN. Therefore the IWU comprises the required adaptations and other possible interworking functions. The interface between the IWU and the CN is specific to the core network. This enables the development of the core networks and the RAN independently of one another. For example, the IWU may be connected to a base station system BSS in a GSM network. Correspondingly, IWU2 may be connected to a local exchange in an ISDN network, for instance. FIG. 1 also shows service providers SP2, SP3, SP4 and SP5, which are connected to core network CN2.

In FIG. 1 a radio access network RAN comprises a transport network TN, a radio network controller RNC and a base station BS. In the network architecture shown therein, the base stations are connected to the TN, which conveys the user data to the IWUs and the control signalling to the RNC. All the intelligence controlling the GRAN is placed in the base stations BS and in the radio network controller RNC. As stated above, this control is typically limited to control functions related to the radio access as well as to the switching of connections through the transport network. The TN may be, for example, an ATM network. However, it should be noted that only one possible implementation of a UMTS access network is described above.

Transition to the use of third-generation mobile communication systems will take place gradually. At the beginning, third-generation radio access networks will be used in connection with network infrastructure of second-generation mobile communication systems. Such a hybrid system is illustrated in FIG. 2. A second-generation mobile services switching centre MSC is connected both to a second-generation radio access network, such as a GSM base station system BSS consisting of a base station controller BSC and base stations BTS, and to a third-generation radio access network consisting of, for example, a radio network controller RNC, an interworking unit IWU and base stations BS. According to a scenario of the GSM MSC, between the MSC and the third-generation radio access network there is preferably a standard A interface. The IWU performs a physical layer conversion, such as a conversion from the ATM to the Primary Rate (E1/T1) and vice versa, and a protocol level conversion, for example a conversion from third-generation rate adaptation and link access protocol (called hereinafter a link access control protocol LAC) to GSM rate adaptation and an L2R/RLP protocol and vice versa in non-transparent transmission, and a signalling conversion, for example from third-generation signalling to GSM A-interface signalling and vice versa. By means of this configuration (standard A interface) a third-generation access network can be connected to any existing second-generation MSC without any modifications in the MSC. This also ensures inter-manufacturer compatibility, i.e. an RNC/IWU of one manufacturer is compatible with an MSC of another manufacturer.

In practice, there will be two different radio subsystems RSS, which share a common infrastructure on the network subsystem NSS level. Second-generation mobile stations MS (such as the GSM) communicate via the second-generation radio access network and third-generation mobile stations MS (such as the UMTS) communicate via the third-generation radio access network. Possible dual-band phones (such as GSM/UMTS) are able to use either radio access network and to perform handovers between them.

However, one problem is related to this network configuration in an inter-RNC handover between radio access networks. If an inter-RNC handover takes place, the RNC/IWU changes, wherefore also the third-generation link protocol unit (situated in the RNC/IWU) changes. This means that the contents of the data buffers in the RNC/IWU are lost. It is possible to restore them only at the application level (between end users). This is contrary to the principles of non-transparent transmission where data integrity should be maintained during transmission. In practice it means that the network configuration disclosed above does not support an inter-RNC handover.

SUMMARY OF THE INVENTION

Therefore an object of the invention is to develop a data transmission method and a network configuration maintaining data integrity in a handover for a non-transparent call between two radio access networks.

The invention relates to a mobile communication system, an interworking unit of a radio access network, a mobile services switching centre, and a call control method.

The basic idea of the invention is to provide a second-generation mobile services switching centre with a protocol unit that also supports a radio link protocol of a third-generation radio access network. In such a case a radio link protocol is set up between a mobile station and a mobile services switching centre without a radio link protocol conversion in the interworking unit of the radio access network. The radio access network merely forwards the radio link protocol transparently between the MS and the MSC, i.e. it extends the protocol to the MSC. When a non-transparent call is subjected to a handover between radio access networks, the same radio link protocol units (in the MS and the MSC) are also used after the handover. Possibly ongoing sequences of selective retransmissions and retransmission requests of the radio link protocol are not interrupted or disturbed, wherefore it is possible to also avoid the manipulation of buffer synchronization which might lead to retransmission complications and the loss or doubling of data as a result of the handover.

In order that the changes in the MSC would be as slight as possible, it is preferable to keep the interface between the MSC and the third-generation radio access network similar to the interface between the MSC and the second-generation radio access network, except for the radio link protocol. In such a case changes in the MSC can be restricted at a minimum to the implementation of the interworking function. However, the third-generation radio access network and the interface between the radio access network and the MSC comprise different rate adaptations and/or physical channels and/or signalling forms. In an embodiment of the invention, an interworking unit of a third-generation radio access network is arranged to carry out a conversion or adaptation between the aforementioned rate adaptations and/or physical channels and/or signalling types.

However, in practice it may be difficult to arrange all the second-generation MSCs to also support a third-generation radio link protocol. Similarly, all third-generation radio access networks will not necessarily enable the transmission of a radio link protocol transparently to the MSC. This might lead to problems with compatibility between the products of different manufacturers.

According to a preferred embodiment of the invention, an interworking unit in a third-generation radio access network supports both conventional second-generation mobile services switching centres and mobile services switching centres according to the invention with two protocols. In the first operating state the interworking unit does not carry out a radio link protocol conversion but it relays the radio link protocol transparently between the mobile station and the mobile services switching centre in both directions. In the second operating state the interworking unit carries out a protocol conversion between the radio link protocol supported by the radio access network and the radio link protocol supported by the mobile services switching centre. The interworking unit uses the arrangement that is supported by the mobile services switching centre connected thereto. If the mobile services switching centre supports both the second-generation and the third-generation radio link protocol, the interworking unit employs the first operating state in order to ensure successful handovers between radio access networks. If the mobile services switching centre only supports the second-generation radio link protocol, the interworking unit employs the second operating state which ensures compatibility but not successful handovers between radio access networks. The operating state may be set fixedly for example in connection with installation. In such a case changing the operating state later requires a separate maintenance or installation procedure. Alternatively, the interworking unit may select dynamically, specifically for each call, the operating state according to the properties of the mobile services switching centre. In such a case the interworking unit automatically uses the correct protocol and no procedures are required by the maintenance personnel. Dynamic selection can be based, for example, on data, a parameter or a command contained in outband signalling of the mobile services switching centre. The selection can also be based on identification of the protocol used by the other party from inband communication.

According to the preferred embodiment of the invention, a mobile services switching centre which supports both a second-generation and a third-generation radio link protocol selects the protocol it uses dynamically, specifically for each call, according to the radio link protocol that is supported by the radio access network through which the call will be switched. If the radio access network supports both the second-generation and the third-generation radio link protocol also at the interface between the mobile services switching centre and the radio access network, the MSC selects the third-generation protocol in order to ensure successful handovers between radio access networks. If the radio access network only supports the second-generation radio link protocol at the interface between the mobile services switching centre and the radio access network, the MSC selects the second-generation radio link protocol in order to ensure compatibility. Dynamic selection can be based, for example, on data, a parameter or a request contained in outband signalling of the radio access network. The selection can also be based on identification of the protocol used by the other party from inband communication. Further, the selection can be based on prior data the mobile services switching centre has concerning the network configuration, i.e. which radio access network supports which protocol.

BRIEF DESCRIPTION OF THE DRAWINGS

The invention will be described below in greater detail in connection with preferred embodiments, with reference to the accompanying drawings, in which.

DETAILED DESCRIPTION OF THE INVENTION

The present invention can be applied in all situations where a mobile communication network supporting a single radio link protocol is connected to a radio access network of a different type utilizing a different radio link protocol. The detailed structure of the radio access network is not significant for the invention. "Radio link protocol" should be understood herein generally to cover not only the present second-generation protocols, such as the RLP of the GSM system, but also all the possible third-generation or later generation link access control (LAC) protocols.

The primary field of application of the invention is connecting third-generation radio access networks, such as the UMTS, to second-generation mobile communication networks, such as the GSM. In the following, the preferred embodiments of the invention will be described by using as an example the second-generation GSM system and the third-generation UMTS. In the description below, the GSM radio link protocol will be called RLP and the UMTS radio link protocol will be called LAC.

Figure 4:
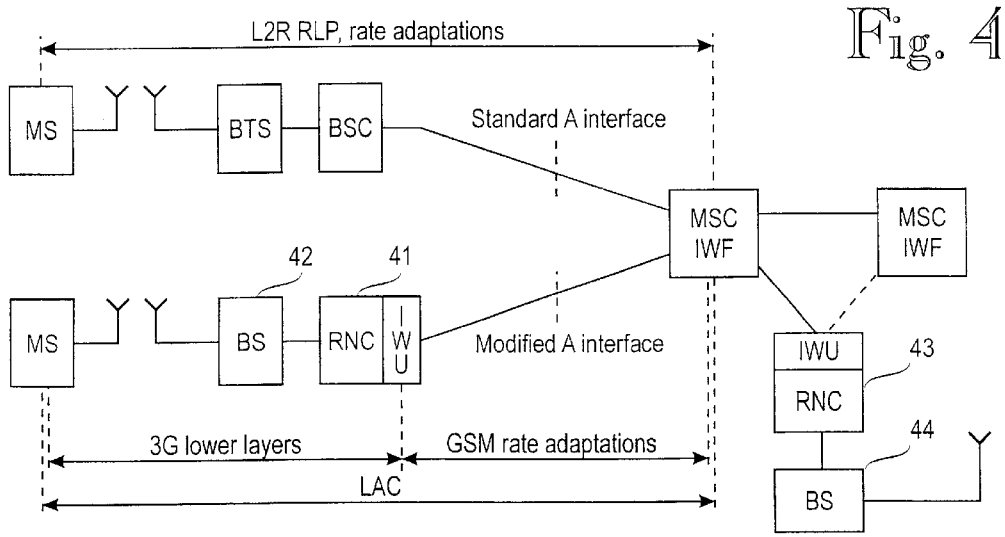
FIG. 4 illustrates a network configuration where a third-generation radio access network is connected to a second-generation mobile services switching centre by a modified A interface according to the invention.

FIG. 4 shows a hybrid network according to the invention where a UMTS radio access network is connected to a GSM MSC by a modified A interface. The modified A interface employs the same physical channels and rate adaptations as a standard A interface, but LAC protocol in non-transparent calls.

A GSM network consists of two basic parts: a base station system BSS and a network subsystem NSS. The BSS and the mobile stations MS communicate via radio connections. In the BSS, each cell is served by a base station BTS. A number of BTSs are connected to a base station controller BSC the function of which is to control radio frequencies and channels used by a BTS. The BSCs are connected to a mobile services switching centre MSC. Certain MSCs are connected to other telecommunication networks, such as the public switched telephone network (PSTN), and they comprise gateway functions for calls terminating at and originating from these networks. These MSCs are known as gateway-MSCs (GMSC). There are also at least two databases: a home location register HLR and a visitor location register VLR.

A mobile communication system comprises adapter functions for adapting an intra-network data link to the protocols used by terminal equipments and other telecommunication networks. The adapter functions typically include a terminal adaptation function TAF placed at the interface between a mobile station and a data terminal equipment connected thereto, and an interworking function IWF situated at the interface between the mobile network and another telecommunication network, usually in connection with an MSC. In the GSM system a data link is set up between a TAF of the MS and an IWF in the mobile network. The TAF adapts a data terminal equipment DTE connected to the MS to the aforementioned GSM data link that is set up over a physical connection using one or several traffic channels. The IWF connects the GSM data link for example to another telecommunication network, such as an ISDN or another GSM network, or to some other transit network, such as a PSTN.

Figure 1:
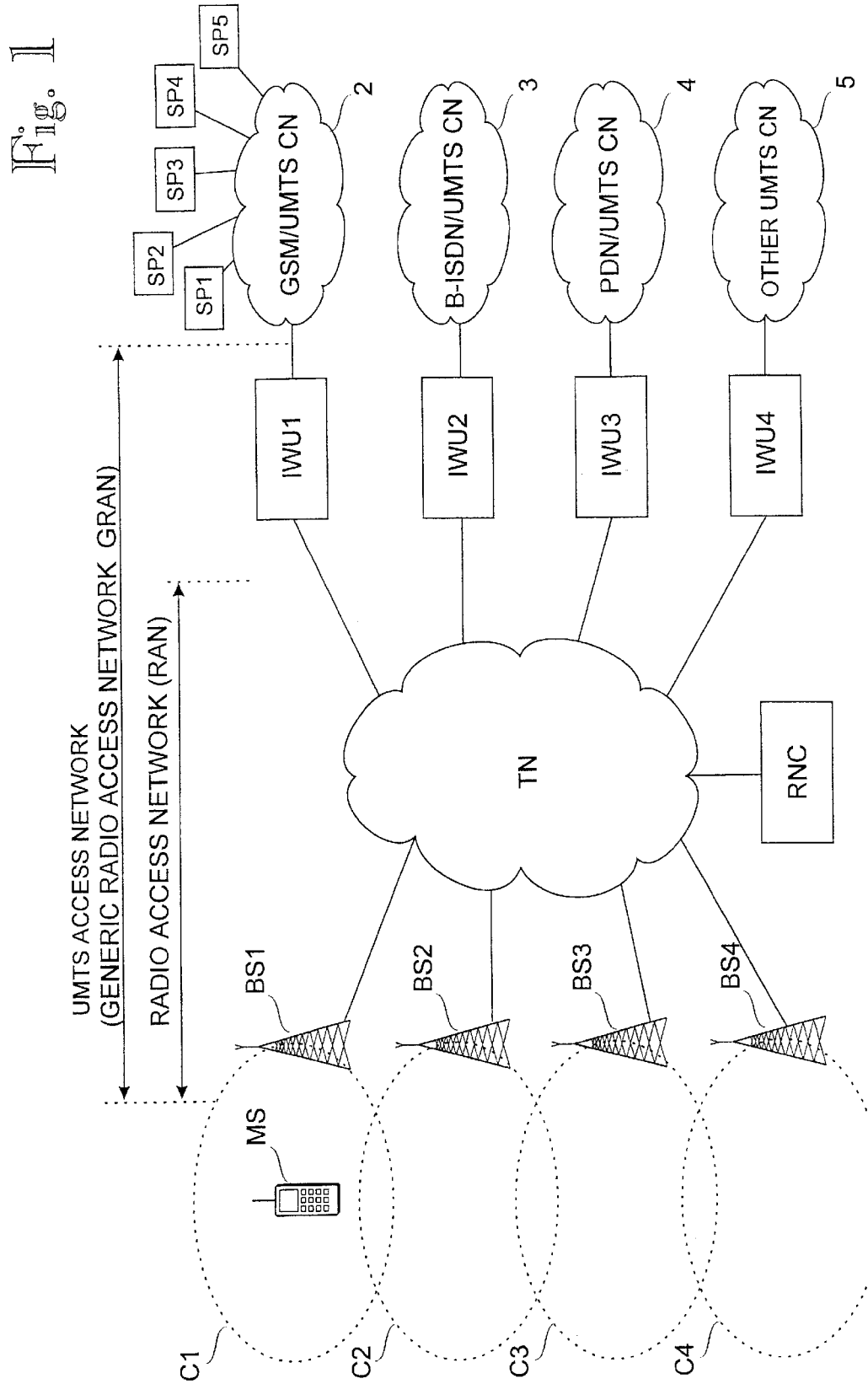
FIG. 1 shows a possible structure of a UMTS access network.
Figure 2:
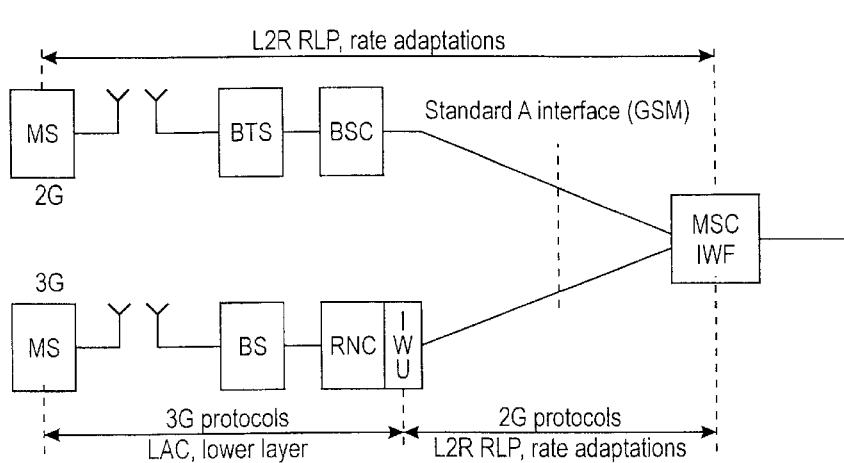
FIG. 2 illustrates a network configuration where a third-generation radio access network is connected to a second-generation mobile services switching centre by a standard A interface.
Figure 3:
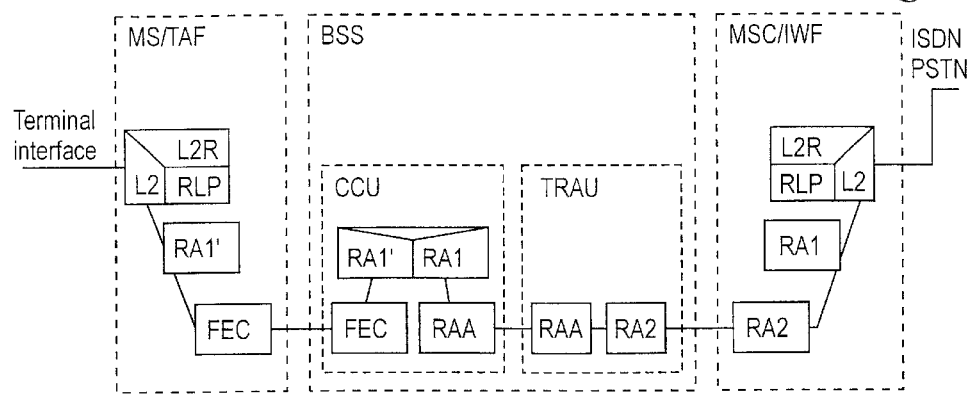
FIG. 3 shows a protocol stack of a non-transparent data service in the GSM system.

FIG. 3 illustrates protocols and functions required for non-transparent bearer services. A non-transparent circuit switched connection between a TAF and an IWF on a GSM traffic channel comprises several protocol layers that are common to all these services. They include different rate adaptation RA functions, such as RA1' between the TAF and a channel codec unit CCU placed in the BSS, RA1 between the CCU and the IWF, RAA (or RAA' for a 14.4 kbit/s channel) between the CCU and a transcoder unit TRAU placed remote from the base station, and RA2 between the TRAU and the IWF. The rate adaptation functions RA are defined in the GSM recommendations 04.21 and 08.20. Communication between the CCU and the TRAU is defined in the GSM recommendation 08.60. Information that has been RA1' rate-adapted in the radio interface is also channel-coded as defined in the GSM recommendation 5.03, which is illustrated by blocks FEC in the MS and the CCU. The IWF and the TAF also comprise higher-level protocols that are specific to each service. In an asynchronous non-transparent bearer service the IWF requires an L2R ( Layer 2 Relay) protocol and a radio link protocol RLP and a modem or a rate adapter towards the fixed network. The L2R functionality for non-transparent character oriented protocols is defined for example in the GSM recommendation 07.02. The RLP is defined in the GSM recommendation 04.22. The RLP is a frame-structured, balanced (HDLC-type) data transmission protocol, where error correction is based on retransmission of distorted frames at the request of the receiving party. The interface between the IWF and for example an audio modem MODEM is as defined in CCITT V.24 and it is denoted in FIG. 3 by L2. This non-transparent configuration is also used to access the Internet.

The RA1 and RA1' rate adaptations map each 240-bit RLP frame into four modified 80-bit V.110 frames (between the MSC and the BSS) or into four modified 60-bit V.110 frames (at the radio interface). A bit sequence called "Frame Start Identifier" is used to indicate which V.110 frame in the bit stream is the first one for a particular RLP frame. The first quarter of the RLP frame is transmitted in this V.110 frame, the second quarter is transmitted in the next frame, the third quarter in the third frame and the fourth one in the fourth frame, whereafter a new RLP frame begins.

In the HSCSD concept of the GSM system, a high-speed data signal is divided into separate data streams, which are then transmitted via N subchannels (N traffic channel time slots) at the radio interface. When the data streams have been divided they are conveyed in the subchannels as if they were mutually independent until they are again combined in the IWF or the MS. However, logically these N subchannels belong to the same HSCSD connection, i.e. they form one HSCSD traffic channel. According to the GSM recommendations dividing and combining a data stream are carried out in a modified RLP, which is thus common to all the subchannels. Below this common RLP each subchannel comprises separately the same protocol stack RA1'-FEC-FEC-RA1'-RAA-RAA-RA2-RA2-RA1, which is shown in FIG. 3 for one traffic channel between the MS/TAF and the MSC/IWF. Therefore an HSCSD traffic channel according to the GSM recommendations still uses the common RLP for the different subchannels even though the bit rate on a single subchannel may be as high as 64 kbit/s.

An example of a third-generation network is the UMTS, which is still under development. It should be noted that the detailed structure of the UMTS access network is not significant for the invention. According to the simplest scenario the UMTS is an access network the functions of which are strictly limited to radio access functions. Therefore it mainly comprises functions for controlling radio resources (handover, paging) and for controlling bearer services (radio network service control). The more complicated functions, such as registers, register functions, mobility management and location management, are placed in a separate network subsystem NSS or in the core network. The NSS or the core network may be, for example, the GSM infrastructure. In FIG. 4 the third-generation radio access network comprises base stations BS and a radio network controller RNC. It is further assumed that the third-generation system employs the link access control LAC protocol, which is different from second-generation radio link protocols, such as the RLP. A physical traffic channel comprises lower protocols, in the frames of which the LAC frames are transmitted. In principle a protocol stack of a third-generation mobile communication system may be similar as described above in connection with the GSM system, except that RLP is replaced with LAC.

With reference to FIG. 4, according to the principles of the invention the MSC is provided with an interworking function IWF supporting both the LAC protocol and the RLP protocol. The adapter unit RNC/IWU of the radio access network is, in turn, arranged to transmit the LAC protocol transparently between the MS and the MC/IWF. However, in the embodiment shown in FIG. 4, the RNC/IWU carries out conversions or adaptations between lower layers of a UMTS traffic channel and lower layers (such as rate adaptations) of a GSM channel. At the modified A interface the LAC is adapted to the lower layers of the GSM traffic channel instead of the RLP protocol. Alternatively, it is possible to set up an RLP protocol between the RNC/IWU and the MSC/IWF and to transmit the LAC frames through the A interface in the data fields of the RLP frames. However, the RLP frames are transmitted without retransmissions and acknowledgements, for example by means of UI (unnumbered information) frames according to the principles of the RLP protocol. The latter alternative is less successful due to the greater overhead.

Figure 5:
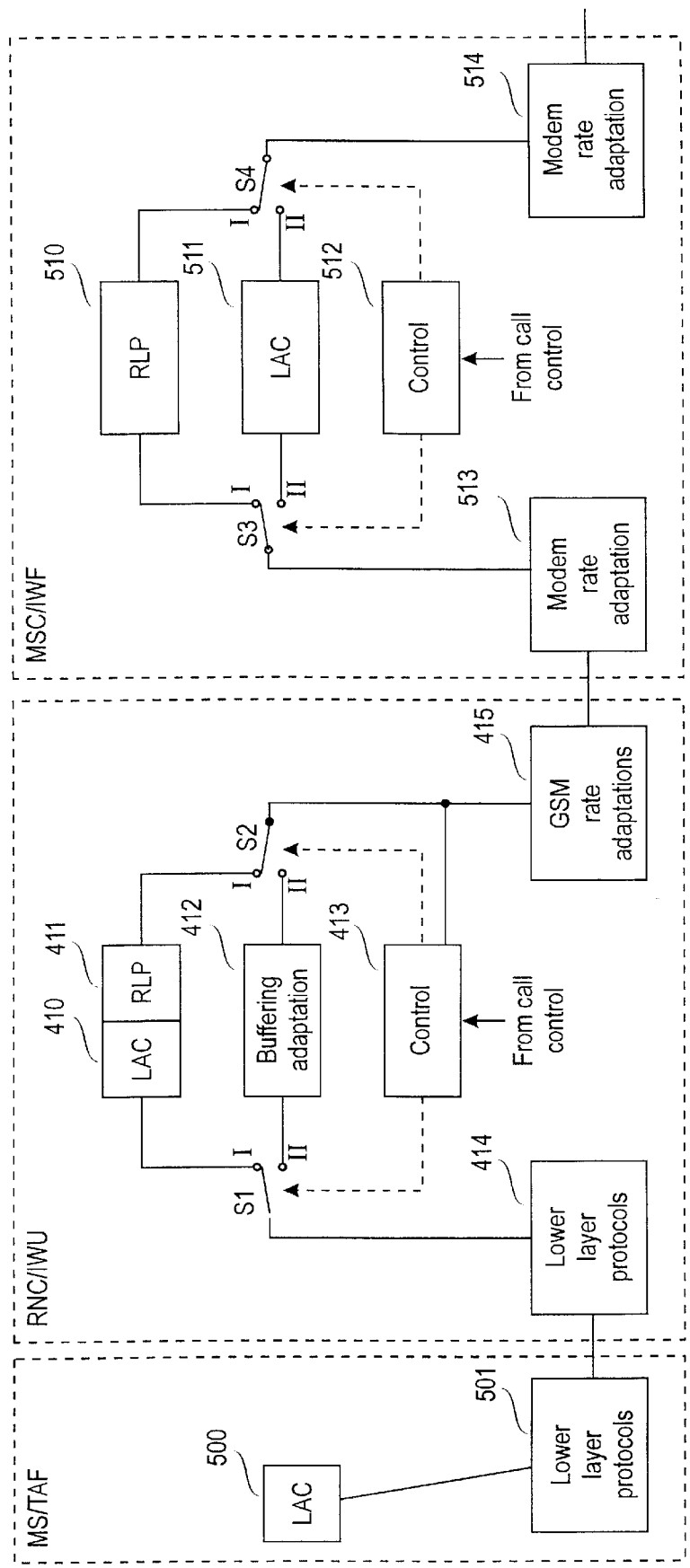
FIG. 5 shows the protocol structure of non-transparent data transmission according to the invention.

As stated above, in practice it may be difficult to arrange all the GSM MSCs and UMTS access networks to support the functionality according to the invention. Therefore, in the preferred embodiment of the invention the RNC/IWU supports both conventional GSM MSCs and GSM MSCs according to the invention comprising two protocols. Similarly, an MSC is capable of selecting the correct radio link protocol specifically for each call. FIG. 5 illustrates the protocol structure according to the preferred embodiment of the invention for non-transparent data transmission.

With reference to FIG. 5, a terminal adaptation function TAF in a third-generation mobile station MS comprises an LAC protocol unit 500, which produces LAC frames that are inserted in a unit 501 into lower-layer protocols of a third-generation traffic channel and transmitted over the radio path. Correspondingly, LAC frames that have been received over the radio path are separated from the lower-layer protocols in the unit 501 and transmitted to the LAC protocol unit 500.

The RNC/IWU comprises a corresponding protocol unit 414 for the lower layers which separates the LAC frames received from the radio path (from the MS/TAF) from the lower-layer protocols of the traffic channel and correspondingly inserts the LAC frames to be transmitted to the radio path into the lower-layer protocols. The protocol unit 414 can be connected by a switching means S1 either to a protocol conversion unit 410, 411 (position I) or to a buffering and adaptation unit 412 (position II). A switching means S2 in turn connects either the protocol conversion unit 410, 411 (position I) or the buffering and adaptation unit 412 (position II) to a GSM rate adaptation unit 415. The states of the switches S1 and S2 are controlled by a control unit 413.

The RNC/IWU may thus have two different operating states with respect to the radio link protocol used, depending on which radio link protocol the MSC/IWF supports. If it is a conventional second-generation MSC/IWF which only supports the RLP protocol, the switches S1 and S2 are in position II. In such a case a third-generation LAC protocol is applied between the MS/TAF and the RNC/IWU, and the GSM RLP protocol is used between the RNC/IWU and the MSC/IWF. The protocol conversion unit 410, 411 converts the LAC frames received from the radio path into RLP frames and correspondingly the RLP frames received from the MSC into LAC frames. This protocol configuration corresponds to the prior art protocol structure and it has a similar problem in inter-RNC handovers as the prior art arrangements.

If the RNC/IWU is connected to an MSC/IWF according to the invention which supports both the RLP and the LAC protocol (as the MSC/IWF in FIG. 5), the switching means S1 and S2 are in position II in the RNC/IWU. In such a case the RNC/IWU is configured to transmit the LAC frames received from the radio path transparently to the MSC/IWF and vice versa. The buffering and adaptation unit 412 buffers the LAC frames in order to even out possible differences and variation in transfer rates. The unit 412 may also comprise other adaptation functions required to transmit LAC frames between the protocol units 414 and 415. The GSM rate adaptation unit 415 adapts the LAC frames to the GSM traffic channel for example instead of RLP frames, as described above. This protocol configuration employs an LAC protocol between the MS/TAF and the MSC/IWF, but different lower-layer protocols are applied between the MS/TAF and the RNC/IWU, and between the RNC/IWU and the MSC/IWF. The protocol configuration according to the invention ensures successful inter-RNC handovers for non-transparent calls.

The IWF of the MSC comprises a GSM rate adaptation unit 513, which corresponds to the rate adaptation unit 415 of the RNC/IWU and carries out the rate adaptations according to the GSM recommendations. The rate adaptation unit 513 can be connected by a switching means S3 to either an RLP protocol unit 510 (position I) or an LAC protocol unit 511 (position II). A second switching means S4 in turn connects either the RLP protocol unit 510 (position I) or the LAC protocol unit 511 (position II) to a fixed network adapter unit 514, which is, for example, a modem and/or rate adaptation. The states of the switching means S3 and S4 are controlled by a control unit 512.

The state of the switches S1 and S2 is controlled by the control unit 413. In an embodiment of the invention, the RNC/IWU is configured permanently either to operating state I, where an LAC/RLP protocol conversion is carried out, or to operating state II, where the LAC frames are transmitted transparently between the MS/TAF and the MSC/IWF. The fixed setting of the switches S1 and S2 can be carried out manually, for example when the RNC/IWU is installed in the mobile network or later when the type of the MSC/IWF changes. In such a case the installation or maintenance personnel knows the radio link protocols supported by the MSC/IWF. The fixed setting of the RNC/IWU to operating state I or II can also be carried out by means of a software configuration. In such a case the RNC/IWU supports only one of the operating sates either on the basis of software parametrization or due to the properties of the loaded software.

In another embodiment of the invention, the RNC/IWU configures itself into operating state I or II automatically, for example in connection with each call. This automatic configuration can be based, for example, on a signalling hint arriving from the MSC concerning the protocol the MSC supports. This hint may be, for example, a parameter in a call-set-up message or in an acknowledgement message. The control unit 413 receives data about the protocol hint contained in the signalling from the RNC call control and it guides the switches S1 and S2 accordingly. For example, it can be assumed that such a parameter is only contained in the signalling of the MSC supporting the LAC protocol. If the parameter is received, the RNC/IWU selects operating state II. If there is no parameter, the MSC is a pure second-generation MSC with only the L2R RLP, in which case the RNC/IWU selects operating state I.

In yet another embodiment of the invention, the RNC/IWU identifies the protocol supported by the MSC/IWF on the basis of the radio link protocol frames transmitted during the protocol link set-up. For example, the default value of the control unit 413 at the beginning of the call can be operating state II. In such a case the RNC/IWU transmits the LAC protocol set-up frames arriving from the MS/TAF transparently to the MSC/IWF. The control unit 413 thereafter looks for a response by the MSC/IWF. If the RNC/IWU does not receive any response during a predetermined time interval or if the number of link set-up attempts exceeds a specified threshold value or if the RNC/IWU receives an RLP frame on the traffic channel from the MSC/IWF, the control unit 413 switches on operating state I, whereupon the RNC/IWU activates the set-up of the LAC protocol towards the MS and the set-up of the L2R RLP protocol towards the MSC/IWF. If the RNC/IWU receives an LAC protocol setup message from the MSC/IWF, the control unit 413 retains operating state II, whereupon the LAC protocol set-up message is forwarded transparently to the MS/TAF.

The MSC/IWF according to the invention also selects the radio link protocol used, i.e. RLP or LAC, specifically for each call depending on which radio link protocol the RNC/IWU supports. If the RNC/IWU supports both the RLP protocol (operating state I) and the transparent transmission of the LAC protocol (operating state II), the MSC selects the LAC protocol (operating state II) in order to ensure successful RNC handovers. On the other hand, if the RNC/IWU only supports the RLP protocol (operating state I) towards the MSC, the MSC selects the RLP protocol (operating state I).

There are different manners in which the MSC or the control unit 512 can terminate the protocol used in each situation. One manner is to use information concerning which RNC is the source or target of the call. For example, when a call originates from a third-generation transmission path at the A interface of the MSC or when it is routed to such a transmission path, the MSC call control indicates this to the control unit 512 for example in an IWF set-up message or it may even route the call within the MSC to an IWF that is capable of supporting a third-generation protocol (LAC). In such a case the MSC can comprise a separate IWF for the RLP protocol and a separate IWF for the LAC protocol. The selection of the protocol according to the target or source RNC can also take place on the basis of stored information concerning the network configuration.

Another manner of identifying the protocol supported by the RNC/IWU is a signalling hint transmitted by the RNC/IWU concerning the protocol. This hint can be, for example, a parameter in a call set-up or an acknowledgement message.

Yet another manner of identifying the protocol is to monitor the link protocol set-up. For example the MSC/IWF can transmit an LAC set-up message towards the MS. The control unit 512 thereafter looks for a response by the RNC/IWU. If no response is received within predetermined time-out or if the number of set-up attempts exceeds a specific maximum number or if the IWF receives an RLP set-up message on the traffic channel from the RNC/IWU, the MSC/IWF activates the set-up of the RLP protocol towards the MS. If the MSC/IWF receives an LAC response, the MSC/IWF continues with the LAC protocol.

Examine below an inter-RNC handover according to the invention 35 with reference to FIG. 4. It is assumed first that both the RNC/IWU 41 and 43 and the MSC/IWF are as shown in FIG. 5. It is also assumed that the MS has set up a non-transparent call via the RNC/IWU 41 such that an LAC protocol is set up between the MS and the MSC/IWF (both the RNC/IWU 41 and the MSC/IWF are in operating state II, FIG. 5).

During the call a handover is performed where the call is switched through the RNC/IWU 43. Even though the routing of the call changes, the LAC protocol units in the MS and in the MSC remain the same, whereupon the sequences of retransmissions and acknowledgements are not interrupted either. Therefore no loss or doubling of data occurs in the handover. The invention is effective regardless of whether the new RNC is under the same or a different mobile services switching centre, since the first MSC of the call operates as an anchor point during the entire call.

It is obvious that as the technology develops the basic idea of the invention can be implemented in several different manners. Therefore the invention and its embodiments are not restricted to the examples described above but they may vary within the scope of the claims.

What is claimed is:

1. A mobile communication system comprising:
   first radio access networks with a first radio link protocol for non-transparent data transmission,
   second radio access networks with a second radio link protocol for non-transparent data transmission, the second protocol differing from the first radio link protocol,
   mobile services switching centres, which support the first radio link protocol, each radio access network being connected to one of the mobile services switching centres,
   an interworking unit in each second radio access network,
   at least some of the mobile services switching centres are arranged to support both the first and the second radio link protocol, and that
   at least some of the interworking units in the second radio access networks are arranged to transmit the second radio link protocol transparently between a mobile station and a mobile services switching centre if the mobile services switching centre to which the second radio access network is connected supports both the first and the second radio link protocol.

2. The mobile communication system according to claim 1, wherein the interworking unit in the second radio access network is arranged to carry out a protocol conversion between the second radio link protocol and the first radio link protocol if the mobile services switching centre connected thereto supports only the first radio link protocol.

3. The mobile communication system according to claim 1, wherein the radio access network and the interface between the radio access network and the mobile services switching centre comprise different rate adaptations and/or physical channels and/or signalling types, and wherein the interworking unit in the second radio access network is arranged to carry out a conversion or adaptation between the rate adaptations and/or physical channels and/or signalling types.

4. The mobile communication system according to claim 1, wherein the interworking unit can be set fixedly or dynamically into a first operating state where a radio link protocol conversion is carried out, or into a second operating state where the second radio link protocol is transmitted transparently, depending on whether the mobile services switching centre to which the corresponding second radio access network is connected supports the second radio link protocol or not.

5. The mobile communication system according to claim 4, wherein the interworking unit is arranged to dynamically select the first or the second operating state in response to signalling transmitted by the mobile services switching centre or depending on whether the mobile services switching centre initiates the set-up of the first or the second radio link protocol.

6. The mobile communication system according to claim 1, wherein the mobile services switching centre is arranged to dynamically select either the second radio link protocol or the first radio link protocol depending on whether the interworking unit supports the transparent transmission of the second radio link protocol in the radio access network to which the mobile services switching centre is connected.

7. The mobile communication system according to claim 6, wherein the mobile services switching centre is arranged to dynamically select the first or the second radio link protocol in response to the signalling transmitted by the radio access network or depending on which radio link protocol is used for the communication received from the interworking unit of the radio access network.

8. The mobile communication system according to claim 6, wherein the mobile services switching centre is arranged to dynamically select the first or the second radio link protocol on the basis of the stored network configuration data.

9. An interworking unit of a radio access network for adapting a radio link protocol of a radio access network to the radio link protocol supported by a mobile services switching centre, the interworking unit comprising:
   a first operating state where the interworking unit is arranged to transmit a second radio link protocol transparently between a mobile station and the mobile services switching centre if the mobile services switching centre to which the radio access network is connected supports the radio link protocol of the radio access network,
   a second operating state where the interworking unit is arranged to carry out a protocol conversion between the radio link protocol supported by the radio access network and the radio link protocol supported by the mobile services switching centre if the radio access network and the mobile services switching centre to which the radio access network is connected support different radio link protocols.

10. The interworking unit according to claim 9, wherein the radio access network and the interface between the radio access network and the mobile services switching centre comprise different rate adaptations and/or physical channels and/or signalling types, and that the interworking unit is arranged to carry out a conversion or adaptation between the rate adaptations and/or physical channels and/or signalling types both in the first and in the second operating state.

11. The interworking unit according to claim 9, wherein the interworking unit is fixedly set in the first or in the second operating state when the radio access network is connected to the mobile services switching centre.

12. The interworking unit according to claim 9, wherein the interworking unit comprises means with which either the first operating state or the second operating state is selected dynamically specifically for each call depending on whether the mobile services switching centre supports the first or the second radio link protocol.

13. The interworking unit according to claim 12, wherein the interworking unit is arranged to dynamically select the first or the second operating state in response to the signalling transmitted by the mobile services switching centre or depending on whether the mobile services switching centre initiates the set-up of the first or the second radio link protocol.

14. A control method for a non-transparent data call in a mobile communication system comprising first radio access networks with a first radio link protocol for non-transparent data transmission, second radio access networks with a second radio link protocol for non-transparent data transmission, the second protocol differing from the first protocol, mobile services switching centres which support the first radio link protocol, each radio access network being connected to one of the mobile services switching centres, and an interworking unit in each second radio access network, the method comprising:

setting up a transmission link between a mobile station and a mobile services switching centre via a second radio access network, the link comprising a first leg between the mobile station and the interworking unit and a second leg between the interworking unit and the mobile services switching centre, using lower protocols of the second radio access network on the first leg and lower protocols of the first radio access network on the first leg, setting up the second radio link protocol between the mobile station and the mobile services switching centre if the mobile services switching centre supports both the first and the second radio link protocol, transmitting the second radio link protocol transparently through the interworking unit of the radio access network between the mobile station and the mobile services switching centre adapted to the lower protocols of the first and the second leg.

15. The method according to claim 14, comprising transmitting a non-transparent call by a handover from the present second radio access network to a new second radio access network, the handover comprising:

setting up a transmission link between the mobile station and the mobile services switching centre via the new radio access network, the link comprising a first leg between the mobile station and the interworking unit and a second leg between the interworking unit and the mobile services switching centre, using lower protocols of the second radio access network on the first leg and lower protocols of the first radio access network on the second leg, retaining the second radio link protocol in the mobile station and in the mobile services switching centre, routing the second radio link protocol via the new radio access network, transmitting the second radio link protocol transparently through the interworking unit of the new radio access network between the mobile station and the mobile services switching centre adapted to the lower protocols of the first and the second leg.

\* \* \* \* \*